United States Patent [19]

Friberg

[11] Patent Number: 4,799,961
[45] Date of Patent: Jan. 24, 1989

[54] CEMENTUOUS FIBER IMPREGNATED CONSTRUCTION COMPOSITION AND PROCESS FOR FORMATION THEREOF

[76] Inventor: Walter R. Friberg, 831 N. Shore Dr., Bellingham, Wash. 98226

[21] Appl. No.: 897,860

[22] Filed: Aug. 19, 1986

[51] Int. Cl.$^4$ .................. C04B 14/38; C04B 16/02
[52] U.S. Cl. .................................. 106/93; 106/99
[58] Field of Search ........................ 106/89, 93, 99

[56] References Cited

U.S. PATENT DOCUMENTS

| | | |
|---|---|---|
| 889,569 | 6/1908 | Albrecht . |
| 1,309,038 | 7/1919 | Light . |
| 1,309,296 | 7/1919 | Marks . |
| 1,484,370 | 2/1924 | Bartlett . |
| 2,057,330 | 10/1936 | Helnrich . |
| 2,377,484 | 6/1945 | Elmendorf . |
| 2,592,345 | 4/1952 | Schnell et al. . |
| 2,899,325 | 8/1959 | Kranz et al. . |
| 3,219,467 | 11/1965 | Redican et al. ............ 106/90 |
| 3,264,125 | 8/1966 | Bourlin ..................... 106/76 |
| 3,311,483 | 3/1967 | Garnier et al. . |
| 3,403,205 | 9/1968 | Ottenholm ................ 264/109 |
| 3,438,853 | 4/1969 | Haines et al. ............ 162/164 |
| 3,502,490 | 3/1970 | Ware . |
| 3,705,837 | 12/1972 | Breslauer . |
| 3,753,749 | 8/1973 | Nutt .......................... 106/93 |
| 3,854,985 | 12/1974 | Suzuki et al. ............. 117/11 D |
| 3,873,351 | 3/1975 | Ueda et al. ............... 117/123 A |
| 3,901,991 | 8/1975 | Ueda et al. ............... 428/446 |
| 4,040,851 | 8/1977 | Ziegler ..................... 106/93 |
| 4,047,962 | 9/1977 | Copeland . |
| 4,101,335 | 7/1978 | Barrable . |
| 4,131,638 | 12/1978 | Whitaker et al. ......... 264/333 |
| 4,132,555 | 1/1979 | Barrable ................... 106/90 |
| 4,268,317 | 5/1981 | Rayl . |
| 4,308,068 | 12/1981 | Copling . |
| 4,308,070 | 12/1981 | Cavicchio . |
| 4,363,878 | 12/1982 | Yamamoto et al. ....... 501/36 |
| 4,373,957 | 2/1983 | Pedersen .................. 106/93 |
| 4,402,751 | 9/1983 | Wilde ...................... 106/93 |
| 4,406,703 | 9/1983 | Guthrie .................... 106/93 |
| 4,497,662 | 2/1985 | Chisolm et al. .......... 106/92 |

OTHER PUBLICATIONS

*The Chemistry of Cement and Concrete*, F. M. Lea, London (1956), pp. 505-506.

*Primary Examiner*—William R. Dixon, Jr.
*Assistant Examiner*—Andrew B. Griffis
*Attorney, Agent, or Firm*—Keith S. Bergman

[57] ABSTRACT

A construction composition comprising an alkalin earth oxide, such as calcium oxide, a siliceous material having a high surface area to volume ratio such as diatomite, cement, fiber and other additive constituents is disclosed. The material may be formed in place or preferably pressure molded to predetermined structural shapes. A method of making the composition is disclosed wherein a dry concentrate of the alkaline earth oxide, siliceous matter, and additives is formed by ball milling; a slurry embodying additional alkaline earth oxide, siliceous material and fiber is formed with heating; and a final composition is formed by mixing the first two mixtures with additional necessary materials, including fiber, cement and siliceous material, to a paste consistency. The paste is preferably molded under pressure and thereafter cured by heating to form structural shapes. The final composition can replace many conventional building materials, may be shaped and fastened after formation similarly to wood, is thermally and acoustically insulative and fire, rot and vermin resistant.

4 Claims, No Drawings

CEMENTUOUS FIBER IMPREGNATED CONSTRUCTION COMPOSITION AND PROCESS FOR FORMATION THEREOF

BACKGROUND OF INVENTION

1. Related Applications

There is pending a Canadian patent application, Ser. No. 427,234, filed by the instant inventor, which includes a part of the subject matter hereof. There are no other related applications heretofore filed in this or any foreign country.

2. Field of Invention

My invention relates generally to cementuous, fiber containing building materials and a particular process for the formation and configuration thereof.

3. Background And Description Of Prior Art

It has heretofore become a common practice in the building construction arts to form composite materials embodying combinations of various individual structural materials that have theretofore been commonly used, such as wood, brick, concrete, fiber board, insulating matter and the like, to attempt to create new materials having more desirable features and less undesirable features than the component elements individually. Increasing costs and greater environmental concerns have added impetus in the recent past to accelerate activity with such composite products and as a result, many and various of such products have become known.

Such materials in general have comprised a mixture of three essential classes of ingredients: firstly, some settable cementuous material, commonly a form of Portland cement or plaster; secondly, some relatively inert filler material that may aid in forming a cementuous matrix, such as sand or various silica-alumina mixtures of earth origin and; thirdly, a fibrous material of relatively low density and substantial insulative properties such as wood or other plant fiber, mineral fiber, synthetic fiber, or the like to lessen density and increase strength and insulative potential.

The prior art in dealing with such materials seems to have concentrated principally upon the relative quantities of the various components in a composite mixture and the addition of new and novel components to one or more of the classes of elements concerned. This art has become quite sophisticated with the passage of time and the use of such products in the building arts has increased somewhat proportionately with the sophistication of the art. Today there are known such products that are readily workable by ordinary hand and power tools and that may be mechanically fastened to other structural elements by nailing, stapling, screwing, adhering or the like, all in a fashion similar to wood. Many of these composite materials are quite durable and are not attacked by common microbal agents or insect pests that are often quite destructive of wood itself. Many such materials are more resistive to a physical or chemical attack, such as by freezing water, action of environmental bases and acids and the like, then ordinary concrete mixtures and have physical characteristics of strength, hardness and density that may be controllably varied over a wide range including at least the same characteristics of the component materials. In addition many such composite products are quite fire retardant or resistant and have substantial insulative values, both thermally and acoustically. Some of such materials, especially of more recent origin, have economic features approaching those of the substances from which they are formed and in some cases even surpassing them.

In distinguishment from this prior art, that has been concerned largely with the quantitative combination of ingredients in such composite construction materials, research had indicated that the manner and method of processing and admixing the various ingredients, both in subcombinations and totally, is at least as important as the quantitative definition of those ingredients, if not more so. My instant invention therefore differs from the aforesaid prior art not only in providing a new and different settable building composition, but also in providing a new and different process for the mixing and formation thereof.

For the siliceous component of my composition, I use diatomite or some similar material providing silica in a form with a very high ratio of surface area to volume. The prior art generally has used some form of crystaline quartz such as sand, particulated chert, or the like which does not have such a high surface area to volume ratio and is not therefore so potentially chemically reactive.

In the cementuous component of my material, I employ both Portland cement and calcium oxide, whereas this component in the prior art has generally comprised only one or the other of these ingredients. More importantly I process the calcium oxide with the siliceous component as a sub-mixture not only to admix the components but also to form or aid in forming a cementuous calcium silicate preliminarily to making a final mix of all ingredients. This process is aided by the particular nature of the siliceous material of my mixture. The prior art generally has not used a siliceous material having a very high ratio of surface area to volume and generally has not pre-processed that material with calcium oxide to allow a pre-formation of calcium silicate.

For the fiber component of my composition I use singulated wood fiber such as obtained from waste paper or as waste product from the paper industry, whereas the fiber component of most prior art compositions generally has been sawdust, shavings or similar agglomerated fiber often untreated to remove various substances deleterious to the cementuous reactions. These fibers have then been used as aggregate, such as sand and gravel are used in regular concrete. This created a combination of relatively weak wood fibers in a relatively strong, but rigid, dense and rock-like matrix which was inherently imbalanced. In my formulation such wood fibers can also be used, and for the common woods such as pine, fir, hemlock and spruce pre-treatment is not required. However, when agglomerated fibers are used, some of the singulated fiber should be also used. My cementuous paste is not so strong as Portland cement paste per se, but in my formulations this is not necessary, or even desirable. The resultant is lighter in weight, more insulative, more workable with cutting tools, and less expensive than that permitted by the prior art.

My process further differs from the prior art in that I form a first slurry of ground paper, quick lime (calcium oxide) and diatomite by boiling for two hours or longer in water or by bringing the mixture to the boiling point and then storing en masse in an insulated container for five days or longer. This slurry may be stored for extended periods after formation. I form a second dry concentrate by ball milling for thirty minutes or longer calcium sulfate, diatomite, and additives of iron oxide, calcium oxide, calcium chloride and other materials, as desired with sufficient water for hydration. This concentrate component may also be stored in an air-tight container for extended periods of time after formation.

I then admix appropriate quantities of the slurry and the concentrate with more diatomaceous earth, Portland cement, fiber, other additives and water, if required, to form a thick paste. The paste is then molded and pressed to remove a substantial portion of its contained water.

Prior art processes generally have not allowed pressing of the final composition as that pressing would remove too much of the cementuous component. My composition allows pressing because of its high fiber content and because of the singulated nature of the fiber which allows that fiber to act as a filter to retain the cementuous component within the composition. After pressing, my composition is a partially set, molded material that can be immediately unmolded and stacked on pallets without slumping. Prior art compositions generally are not self-supporting for substantial periods of time after formation which adversely affects the economics of their processing. My material after unmolding may be air cured or preferably kilned at approximately 65.5 degrees C. for 12 hours or longer until a more permanent set of substantial strength is obtained.

None of the construction compositions of the prior art are known to be produced by a process such as that herein disclosed. My product similarly differs from the prior art, either singularly or in any combination, by reason of the different materials comprising its components and also by reason of the nature of the ultimate product produced therefrom, all as hereinafter more particularly described and claimed.

SUMMARY OF INVENTION

My invention generally provides a settable building composition formed of cementuous, fiber and filler components to create a moldable product, of relatively low density and high strength, that has superior physical and economic characteristics.

In forming such a composition, with percentages determined by dry weight of each component composition, I create a first slurry by boiling in an aqueous solution for at least two hours from 0 to 20 percent fiber, 20 to 50 percent calcium oxide, and 20 to 60 percent siliceous material such as diatomite. I create a second dry concentrate by ball milling together for thirty minutes or more from 10 to 25 percent calcium oxide, 5 to 20 percent calcium chloride, 0 to 50 percent calcium sulfate, 0 to 10 percent iron oxide, 10 to 20 percent diatomite, and other additive materials such as Portland cement and calcium stearate, if required. I then prepare a final composition of the slurry, the concentrate and additional Portland cement, siliceous material, fiber, and other additives, to form a thick paste. The paste is press molded to remove a substantial amount of contained water. The composition may thereafter be immediately removed from a mold and kiln cured at approximately 65.5 degrees C. for at least 12 hours until a final set and reasonable strength have been obtained and substantial moisture removed from the product.

In creating such a process and providing such a product, it is:

A principal object of my invention to provide a settable composite building construction material that is of relatively low density for its strength and of relatively low cost, but one that yet may be handled and used in substantially the same fashion as other building materials for similar purposes.

A further object of my invention to provide such a material that is fire resistant, not readily attacked by micro-organisms or vermin and substantially insulative, both thermally and acoustically.

A further object of my invention to provide a new and novel process for forming such material from component classes of cementuous matter, fiber and other materials, with individual components and processed particularly determined to create the aforesaid products.

A further object of my invention to provide such a process that combines components in intermediate mixtures and thereafter combines the intermediate mixture with each other to provide a product that is of a uniform, substantially reacted nature and one with controllable and uniformly variable characteristics throughout the component ranges specified.

A further object of my invention to provide such a process that creates a moldable construction material that may be pressed in a mold to remove substantial portions of contained water without deleterious leaching of cementuous material and may be unmolded immediately after pressing to then be self-supporting for further processing.

A still further object of my invention to provide such a product that may be cured after molding at reasonably low temperature and without the necessity of steam, all to conserve energy and lessen production costs.

A still further object of my invention to provide such a product and process that are relatively simple and economic, of rugged and durable nature, of new and novel design and otherwise well adapted for the uses and purposes for which they are intended.

Other and further objects of my invention will appear from the following specification and claims which form a part hereof. In carrying out the objects of my invention, however, it is to be understood that its features are susceptible of change in design and arrangement with only preferred and practical embodiments being described as is required.

DESCRIPTION OF PREFERRED EMBODIMENT

My invention generally provides a composite settable building construction material that is moldable. My formation process creates intermediate reacted mixtures that are combined to provide a paste that may be pressed in a mold to remove water to create a product that sets to a self-supporting nature to allow immediate unmolding. In describing my composition, all percentages are expressed as proportionate parts of the particular composition or mixture referred to by dry weight, unless otherwise indicated.

The components of my composition comprise three essential classes: firstly, cementuous materials; secondly, fibrous materials; and thirdly, siliceous materials and additives. My composition generally includes at least 5 percent of an alkaline earth oxide and at least 15 percent of Portland cement in its cementuous component. It may also include as an additive in this component up to 20 percent of calcined gypsum. The composition includes in its fibrous components about 15 to 50 percent of fiber, at least part of which is processed singulated wood fiber obtained as mill waste or by pulping paper waste. The siliceous component comprises from 10 to 60 percent of siliceous material having a high ratio of surface area to volume, such as diatomite or possibly tribolite, and such additives as ferric oxide, clay, calcium chloride and possibly acrylic polymeres and calcium stearate. No additive materials are necessary in my invention, but if used each of the additive materials generally performs in my compositions their ordinary functions as evidenced in other cementuous mixtures.

The known operative limits of these various components and of their intermediate mixtures are set forth in the following Table for ease of reference. The components are operative over wide ranges and the limits set forth are determined from practical operability and not as limits of absolute operability.

TABLE I

| Intermediate Mixture | Composition of Intermediate Mixture in Percent by Weight | | Intermediate Composition in Final Mixture in Percent by Weight |
|---|---|---|---|
| Slurry | Calcium oxide (quicklime) | 20–50 | |
| | Diatomite | 20–60 | 10–50 |
| | Fiber | 0–20 | |
| Concentrate | Calcium Oxide (quicklime) | 10–25 | |
| | Calcium Chloride | 5–25 | |
| | Calcium Sulfate | 0–50 | 3–10 |
| | Diatomite | 10–20 | |
| | Ferric Oxide | 0–10 | |
| | Portland Cement | 0–10 | |
| Supplement | Portland Cement | 5–40 | |
| | Fiber | 10–35 | 40–80 |
| | Diatomite | 10–50 | |

The cement of the cementuous component is an hydraulic cement comprising ground calcium silicates and calcium aluminates as commonly produced in ordinary Portland cement of the present day construction industry. Construction grades of such cements are quite satisfactory in my composition. Variant compositions of cements, as presently known in commerce, are operative with my invention and tend to produce the same results in my compositions as they do in ordinary cementuous and concrete mixtures. The high-burn, finely ground cements will tend to produce a more rapid set, a more completely reacted and chemically balanced cement, and a harder more dense product. The aluminous cements will tend to produce a quicker setting, sulphate resistant compound, and so on.

The alkaline earth oxide ingredient of the cementuous component is preferably calcium oxide, and may include hydrated calcium oxide. I prefer calcium oxide to the hydrated form of this material because the former is more chemically reactive, and because its hydration contributes heat during the ball-milling process and thereby accelerates other chemical reactions that occur during this process. Calcium hydroxide should not be used in making the concentrate; it may be used in making the slurry, although the oxide form is preferable there also. If calcium oxide be used, it chemically combines with moisture present in other components to hydrate during the milling process and remains relatively uncaked. If enough water is not present in the concentrate mixture to completely hydrate the calcium oxide, additional water is added to accomplish this end. Probably other alkali oxides, and particularly those of sodium, might be used in my composition, though there would be little purpose in so doing because of the greater cost of such compounds and their deleterious secondary reactions.

Calcium sulphate in the form of calcined gypsum may be added to the composition as a cementuous material, but it tends to form a softer, less resistant ultimate material if used in larger quantities. It tends to accelerate the setting process and when used in smaller quantities (up to 10%) it enters into the chemical reactions of the cementuous material to cause an increase of strength and a decrease in weight of the ultimate product. The calcium sulfate may be the hemi-hydrate form, which causes earlier setting, or the anhydrous form which causes higher strength, or any combination.

The fibrous component of my composition preferably comprises processed wood fibers, though it may include most any fibrous materials of mineral, plant or synthetic origin that are not reactive with other components of my composition. The fibrous component in general provides the attributes in my composition that are normally provided by wood. The component lessens the overall density of the composite material and adds somewhat to its strength, depending on the particular physical and chemical characteristics of the fiber involved. Fiber increases both thermal and acoustical insulative properties and tends to make the finished product workable and fastenable in a fashion similar to wood. I prefer this component to comprise processed wood fibers because such fibers are economically obtainable by pulping waste paper or as pulp waste from paper mills. In addition the processed wood fibers have the bulk of lignin, oils, resins and other raw wood materials removed so that such matter may not have a deleterious effect in my composition. Raw wood fiber, especially as derived from wood chips or sawdust, of pine, spruce, fir, hemlock and other species may be pulped and used with my composition. These later fibers will produce a usable product, even if somewhat inferior to processed wood fiber, and they may offer some advantage in that this type of fibrous material is oftentimes longer then processed wood fiber and provides the additional benefits of fiber length. Other fibrous materials, especially of cellulosic nature, also my be used to produce a satisfactory product. Exotic fibers, such as alkali resistant glass, graphite, metals, polymeric material and the like, may be used and if they are, generally will impart substantial strength to my composition. Their cost, however, is usually prohibitive except for specialized uses.

Though singulated fibers such as pulped paper or the waste material from paper mills (usually called "sludge") is the preferred fiber, other wood fibers have usefulness and provide specific advantages. For increased bending strength for example, I use stranded wood somewhat resembling toothpicks in shape. For uses in exposed constructions where pleasing aesthetic appearance is desirable, I use cedar, including the bark, and wood chips with attractive texture and color or wood fibers colored with dyes or stains. When the amount of wood chips or long fiber exceeds, by dry weight, the weight of singulated wood fiber, I prefer to vary the composition of the concentrate and to use it in a different way in the mix. Such a concentrate is made by omitting the cement and gypsum and replacing them with more calcium chloride and calcium oxide. Then, instead of adding the concentrate to the slurry, I mix the concentrate thoroughly with the wetted wood chips or long fibers and let the mixture stand at least three days, and preferably longer, at 20 degrees C. During the final mixing operation these treated wood fibers are added last after the other ingredients.

The siliceous component of my composition provides silica in a physical form that has a high ratio of surface area to volume. I prefer a material such as diatomite, although both finely particulated chert, tripolite and fine sands may serve the purposes of my invention if specially processed. Chemically, diatomite is diatomaceous silica. In nature it occurs as diatomaceous earth in deposits of the skeletal remains of microscopic plant organisms. Most deposits contain too much impurity, such as clay and volcanic ash, for many commercial uses, but these deposits are suitable for my use and are available in large quantities at low prices. Because of its organic origin diatomite has an extremely high ratio of surface area to volume. The reason for the desired high surface area to volume ratio is that my process in its intermediate steps allows the interreaction of calcium oxide with silica to form calcium silicates and this reaction is generally enhanced by the high surface area of the siliceaous material, since the reaction generally proceeds rather slowly at the surface of that material.

Various argillaceous and alumina containing materials may be used with the siliceous component of my composition, and are operative in it, though they normally produce an inferior product to that produced by the purer silicious materials.

Most additives common in the concrete arts generally may be used in my composition and have substantially the same qualitative effect as in general cement mixtures. Clay may be used as an additive and would provide both silica and alumina to the composition. It, however, tends to provide more of an alumina component then a silica component and because of this, tends not to be so effective as the preferred siliceous ingredients. The alumina reaction with calcium is somewhat the same as with siliceous materials in cements generally, except that calcium aluminates are slower and more difficult of formation. Clay provides a platey structure which does somewhat aid its chemical activity and increase its surface area, though it reacts relatively slowly with calcium oxide to form cementuous compounds. Aluminates in the form of clay increase the plasticity of the wet mix and increase the hardness and compressive strength of the final product, but they should not be used in excess of about 5 percent.

Some clay may be added to my composition if certain types of paper, such as slick surfaced magazine papers, are used as a fiber component, since such materials commonly include a clay additive. In relatively low amounts as obtained in this fashion, such clay is beneficial.

Ferric oxide may be included in the concentrate as an additive. It tends to add somewhat to the strength of the ultimate composition and may be desirable as a coloring agent. Color in the wet mix is helpful because it aids in determining the adequacy of mixing, as only when the entire mass assumes a uniform color has there been sufficient mixing.

Calcium chloride may be added as an accelerator to the setting action of the cement used in my composition. The calcium chloride also seems to cause a better adhesion of cellulostic fibers to the cementuous matrix and this tends to form somewhat of a stronger material.

An acrylic polymers may be used as an additive. This material tends to increase the surface adhesion of the fibrous component with the remaining matrix material and thereby adds some additional strength to the ultimate composition. As well known in the cement arts, it also tends to encapsulate cement particles and allow hydration to proceed within the encapsulated mass without further contact with dampness to provide a stronger and more uniform ultimate product. This is particularly advantageous in relatively thin masses of my composition. Acrylic polymers are particularly valuable as an additive when my composition is used as a plaster or stucco where unusually high adhesion is essential. Also, the thin applications of plaster and stucco tend to dry too rapidly and hydration of the cementuous materials is then often incomplete. The encapsulation action causes hydration under such conditions. In general the acrylic polymers increase the cost of the composition substantially, however, and are not required except for their special properties.

Most other additives used in the present day concrete arts may be used in my composition. They, in general, will not deleteriously affect my composition and will tend to provide substantially the same reactions as they do in ordinary concrete mixtures.

The method by which I process and admix the components of my composition is essential to the formation of my final product. I generally admix various components into a first slurry and a dry concentrate, both of which after formation are intermixed with each other and with additional dry components and slurried pulp, if required, to form a thick moldable paste which is further processed by molding, pressing and curing to form the final product.

The first slurry is formed of from 20 to 50 percent of calcium oxide or quick lime, from 0 to 20 percent of fibrous component and from 20 to 60 percent of the siliceous component, based on dry weight of the slurry only. Most commonly the fibrous component comprises processed wood fibers derived from ground or pulped waste paper. The siliceous component normally comprises diatomite. These components are combined with sufficient water to form a thick but pourable fluidic slurry that is maintained at a boiling temperature for a period of at least 2 hours, with replacement of water as necessary to maintain appropriate fluidity. The primary purpose for using paper fiber in the slurry is to help maintain the slurry in a fluid state for ease of handling. When diatomite and lime are mixed with water a gel is formed unless an undesirable excess of water is used. More paper fiber than the percentage stated can be used and part may be paper mill waste or sludge, but using more than the amount needed to maintain fluidity adds to the cost of manufacture.

This first intermediate slurry, once formed, is of a pumpable consistency and may be so handled for transport in pipes and storage in tanks. Once formed, the slurry maintains its nature for substantial periods of time that appear to be indefinite, without any particular time oriented separation of components.

A dry concentrate is formed of from 0 to 10 percent Portland cement, up to 50 percent calcined gypsum, from 10 to 20 percent of a siliceous component, up to 10 percent of ferric oxide, from 10 to 25 percent calcium oxide, 5 to 25 percent of calcium chloride, and such other additives as may be desired, based on the weight of the concentrate only. This material is processed in a ball mill for at least thirty minutes. I prefer to use a mill having a steel drum with steel balls and to operate the mill with the axis of rotation substantially horizontal and speed such that the balls rise about ½ to ⅔ of the vertical height of the side walls to then tumble back upon each other. This milling should proceed in an average mill and with the parameters indicated for a period of at least thirty minutes and preferably one hour or more.

I have found that extensive ball milling of my intermediate concentrate affects the nature of the mixture, either physically, chemically or both. The exact reactions involved with the components during the milling process are complex and not definitely known. It appears, however, that the very localized areas of energy dissipation caused by ball impaction apparently expend energy thermally by creating a relatively high temperature in a relatively small area for a relatively short period of time. This environment apparently causes or predisposes some chemical activity in the components, most probably to aid in forming calcium silicates or intermediates of one sort or another. The product produced by extended ball milling has been found to be substantially different in its nature and reactions then that produced by only sufficient milling to cause a reasonably uniform admixture of particulate materials.

Some moisture normally will be contained in the components of the concentrate and this, under normal conditions, will be expended in hydrating the quick lime. If there is not sufficient water present to completely hydrate this component, additional water should be added to do so. If other cement additives, such as masons clay, or calcium stearate are to be included in the ultimate mixture, they normally should be added to this concentrate and milled with it, at least for a sufficient period to be homogenously admixed therein.

Hydrated lime should not be used initially as a component of the intermediate concentrate as it commonly will cake, compact and form somewhat agglomerated structures in the ball mill to tend to disrupt the milling operation. I therefore prefer calcium oxide, which does not seem to have this tendency. A surplus of water should not be added to the mixture, however, beyond that required to hydrate the calcium oxide, or the caking problem may again develop. The milling process may be aided to some degree, especially in aiding admixture and preventing caking, by the addition of some dry fibrous component. In general, however, depending on the nature of the fiber used, it is simpler to introduce fiber in an aqueous slurry.

My final composition is prepared from the intermediate slurry and the concentrate with such additional components as may be required to produce the required quantities of ingredients therein. The final composition is preferably mixed in a shear type mixer, such as one commonly used in the present day art for concrete with a stationary drum followed by the concentrate and any other dry ingredients required in the mix and finally, any additional fibrous component. Appropriate water, if required, is added to form a thick paste, such as might be supported on a ten mesh screen. Mixing of the material is continued for at least 4 to 5 minutes until a uniform, homogeneous mass results without any agglomerated masses of component materials.

Commonly, the appropriate proportion of the various constituent ingredients may not be attained in the final composition from only the intermediate slurry and the intermediate concentrate. Additional amounts of required components, generally cement, diatomite and fiber need be added. Most of the fibrous component is added during the final mixing stage because this is more economical. Most of the diatomite is also added during this final mixing stage, partly for the same reason, and additionally because adding the diatomite in this final stage produces a different reaction than that which occurs in the making of the slurry. A calcium silicate is formed in both reactions, but tricalcium silicate is primarily formed in the former and dicalcium silicate in the latter. These calcium silicates react differently with the other components of my composition, and the combination is advantageous.

After mixing of the final composition has been completed, the material is placed in appropriate molds by pouring or otherwise. The molds are so designed that they may be subjected to a press type pressure, such as from a flat plate on one surface, and provide appropriate escape channels for liquid that may exit the composition during the pressing process. The composition is subjected to pressure of approximately from 10 to 100 pounds per square inch for a period of time to allow such water as may be removable from the composition under the given pressure to be removed. The product then may immediately be unmolded and will be sufficiently set to be self-supporting without any gravity caused slump from its molded form. The product may generally, depending on its shape, be immediately unmolded and supported in stacked array on a pallet with other molded product for curing.

This moldable feature of my composition is not common with composite construction materials of the prior art as in general, if they be de-liquified by pressing under any substantial pressure, large proportions of cementuous material are extracted from the compositions with the liquid removed during the pressing process and the resultant product is substantially weakened or, if additional cementuous material be contained so as to compensate, is substantially more expensive. My product allows such pressing because of its fibrous content and the particular nature of that fibrous content in the composition. The fiber tends to act as a filter to retain cementuous material within the composition during pressing and to not allow the passage of any substantial amount thereof from the composition during the process. This provides a distinct advantage not only in the product itself but also in the process for forming it, as it decreases processing time and cost considerably.

The amount of water contained in the final composition may vary considerably and it reacts in a fashion in my composition similarly to its reaction in ordinary concrete mixes. A lesser amount of water will hasten setting of the mixture but a higher amount of water generally will provide a better cured product. Generally the water should be regulated to control the density of the product more then its setting time, as if rapid setting be required this may better be accomplished by chemical additives. In addition if excessive amounts of water are used, they may tend to leach more of the cementuous material during the pressing process. The water generally should be regulated to provide a cementuous product of reasonable density but should not be much greater than the amount required to so do.

After the product is molded, it is cured to attain its final set and increase its strength. Preferably it is kiln cured at a temperature of approximately 150 degrees F. for a period of at least 12 hours. The material tends to harden and strengthen in a fashion similar to concrete and its period of total curing is substantial, extending over some 3 to 4 weeks to attain a substantial amount of approximately 90 percent of its ultimate strength if it is cured without kilning and at lower temperatures. About half of that ultimate strength will be attained, however, in the 12 hour cure period specified. The higher the content of siliceous material and calcium oxide in the final composition, the longer time will be required for curing of the composition and attainment of ultimate strength.

My composition may be formed into various building configurations, such as blocks, sheets or the like. It may be formed in larger masses and cut, as by sawing, into slabs or other desirable structural shapes. After the composition has cured, it can be nailed, sawed and otherwise handled substantially like wood. In sawing, oftentimes a blade with fewer teeth than normal, commonly 3 to 4 teeth per inch, should be used and it may be necessary to cool or lubricate the blade with water or other known materials to prevent blade damage. The product generally can be smoothed like wood and, in fact, can even be burnished, if desired, by abrasion, especially while slightly damp.

My composition may also be used as a plaster, stucco and mortar. The method of manufacture is the same, but the percentage of Portland cement is increased for this use, up to 40 percent by weight of the total components. Acrylic polymer is also added, usually 5 to 15 percent by dry weight of the cement. The other ingredients are decreased proportionally.

The finally mixed composition may be directly placed in plastic form in a building construction, if desired, in a fashion similar to concrete. It should be noted, however, that the compressed product will be stronger, more dense and tend to cure more rapidly then the directly placed material.

Various compositions made in accordance with the foregoing description are illustrated in the following Table II:

ingredient is expressed as a percentage of dry weight of the total composition, but it should be noted that some ingredients function as a part of an intermediate mix, which, in the formation process, are separate entities from the final mixture.

The cement used in each example was ordinary commercial type 1 Portland cement. The siliceous component was an 85 percent pure diatomite silica of ordinary commerce. No additives other than those indicated were used in any of the compositions.

The fire resistance of the compositions has not been specified for the various samples as there is no numerically accurate method of measuring it. All of the samples indicated, when heated in a flame to 2,000 degrees show incandescence but maintained structural integrity. When the heat source was removed, the material cooled to a blackened mass, weakened in its structural characteristics but intact. Materials similar to those set forth have been tested under ASTM standards and show that an eight inch thick wall far exceeds the requirements for a fire wall for eight hours duration and a three inch thick wall exceeds the fire wall requirements for four hours. The fire resistivity is somewhat inversely proportional to the amount of fiber content in the material.

The thermal insulative factor for each individual composition was not specifically determined. In general, with materials of my composition, a mixture having a specific gravity of 0.65 will have a "K" value of 1 and the "K" value varies therefrom as almost a straight line function of specific gravity. Extrapolating on this basis, the compositions set forth in the table would be assumed to have "R" values of at least 1.33.

Although the amounts of ingredients do not vary widely in the eight examples shown in Table I the strengths do vary considerably. The difference is caused by the methods of processing. The four examples shown in columns A, B, C and D are of inferior quality, but are shown for comparative purposes to

TABLE II

| COMPOSITION AND CHARACTERISTICS OF SPECIFIC FORMULATIONS | | | | | | | | | |
|---|---|---|---|---|---|---|---|---|---|
| Component or Characteristics | | Examples (FIGS. are % of the dry weight) | | | | | | | |
| | | A | B | C | D | E | F | G | H |
| Slurry | Calcium Oxide | 9 | 9 | 9 | 10 | 8 | 14 | 10 | 10 |
| | Diatomite | 0 | 25 | 30 | 28 | 12 | 26 | 25 | 12 |
| | Fiber | 0 | 0 | 0 | 0 | 5(a) | 8(c) | 15(b) | 7(d) |
| Concentrate | Calcium Oxide | 1.2 | 1.2 | 0.72 | 0 | 0.88 | 0.96 | 1.54 | 0.88 |
| | Calcium Chloride | 0.6 | 0.6 | 0.36 | 0 | 0.60 | 0.48 | 1.05 | 0.60 |
| | Calcium Sulfate | 1.9 | 1.9 | 1.14 | 0 | 1.60 | 1.52 | 2.80 | 1.60 |
| | Diatomite | 1.0 | 1.0 | 0.60 | 0 | 0.60 | 0.80 | 1.05 | 0.60 |
| | Iron Oxide | 0.3 | 0.3 | 0.18 | 0 | 0.32 | 0.24 | 0.56 | 0.32 |
| Additional Ingredient | Diatomite | 49 | 24 | 22 | 25 | 37 | 22 | 23 | 38 |
| | Portland Cement | 19 | 18 | 19 | 22 | 19 | 16 | 20 | 17 |
| | Fiber | 18 | 19(e) | 17(a) | 15(a) | 13(c) | 10(c) | 0 | 8(c) 4(d) |
| Specific Gravity | | 0.55 | 0.513 | 0.513 | 0.657 | 0.609 | 0.609 | 0.705 | 0.692 |
| Compressive Strength (psi) | | 272 | 319 | 362 | 388 | 386 | 920 | 1417 | 1163 |
| Bending Strength | | 118 | 181 | 194 | 127 | 346 | 235 | 581 | 539 |

(a) Pulped newspaper
(b) Pulped magazine paper
(c) Paper mill waste (sludge)
(d) Unprocessed wood fiber Each of the examples listed was selected for its typicality and is representative of the general composition it describes. All of the physical test data set forth resulted from tests of each composition according to existing standards of the American Society for Testing Materials where existent and otherwise according to standard engineering practices. In the table the amount of each illustrate the benefits of my process.

The first two examples set forth, "A" and "B", show mixtures that are not prepared in the manner of my instant invention. The first composition "A" was merely a mixture of the ingredients specified, all combined and physically mixed together at one time. The second composition "B" was formed without the concentrate being ball milled. The composition "C" was properly formed according to my process, but the molded product was not pressed. The composition "D" omitted the concentrate and although the amount of cement was increased and the processing was properly done the strength was low.

Compositions "E" thru "H" show examples of the complete and ultimate processing according to my invention as specified and all, generally, present appropriate physical characteristics to make them viable building materials readily competitive with other similar materials of present day commerce. These latter composition all use a first slurry formed in a heated solution, as previously described, and this tends to provide the improved results indicated. The use of the intermediate mixtures provides a ready means to control the physical characteristics of the ultimate composition and in general these characteristics vary as hereinbefore described with strengths usually somewhat proportional to density. Compositions "G" and "H" are better than "E" and "F" because the concentrate was ball milled longer and they were heat cured longer.

As is apparent to those skilled in the art, in light of the foregoing disclosure, many alterations and modifications are possible in the practice of my invention without departing from its spirit, essence or scope. Accordingly, the invention is to be construed as defined by the following claims.

Having thusly described my invention, what I desire to protect by Letters Patent, and what I claim is:

1. A method of preparing a moldable cementuous building composition containing wood fibers, comprising:
   (a) forming a first slurry by boiling for at least two hours a first aqueous slurry comprising on a weight basis:
      (1) about 0 to 20 percent fibrous material, at least part of which is processed wood fiber,
      (2) about 20 to 50 percent calcium oxide,
      (3) about 20 to 50 percent particulated silicious material chosen from the group consisting of diatomite, diatomaceous earth, tripolite and chert,
      (4) water to 100 percent to form a fluidic slurry:
   (b) allowing the first slurry to stand for at lease three days after formation;
   (c) forming a second dry concentrate by ball milling for at least thirty minutes a mixture comprising on a weight basis
      (1) about 10 to 25 percent calcium oxide,
      (2) about 5 to 20 percent calcium chloride,
      (3) about 0 to 20 percent of calcium sulfate,
      (4) about 10 to 20 percent of particulated silicious material chosen from the group consisting of diatomite, diatomaceous earth, tripolite and chert,
      (5) about 0 to 10 percent iron oxide, and
      (6) about 0 to 10 percent Portland cement;
   (d) mixing on a weight basis from about 10 to 50 percent of the first slurry and from about 3 to 10 percent of the second dry concentrate with from 40 to 80 percent of a third supplement mixture comprising on a weight basis:
      (1) about from 5 to 40 percent Portland cement,
      (2) about from 10 to 35 percent fiber, at least part of which is processed wood fiber, and
      (3) about from 10 to 50 percent particulated silicious material chosen from the group consisting of diatomite, diatomaceous earth, tripolite and chert.

2. The process of forming a moldable, settable cementuous construction composition containing wood fibers, including at least:
   (a) boiling a mixture of calcium oxide, silicious material chosen from the group consisting of diatomite, diatomaceous earth, tripolite and chert, and fiber including at least wood fiber in water for at least two hours to form a slurry,
   (b) ball milling a mixture of calcium salts, including at least calcium oxide and calcium chloride, and particulated silicious material for at least thirty minutes to form a dry concentrate, and
   (c) combining and mixing the first slurry and the dry concentrate with additional cement, fiber and silicious material to form a construction composition.

3. The method of claim 2 further characterized by:
   (a) molding the construction composition in a mold, and
   (b) subjecting the molded construction composition to pressure to extract a portion of contained water therefrom to form a self-supporting product.

4. The method of claim 3 further comprising:
   (a) unmolding the molded and pressed product and
   (b) curing the unmolded product at a temperature of from 37 to 94 degrees C. for a period of at least 12 hours.

* * * * *